March 30, 1965 R. W. WILMARTH 3,176,232
BACKWARD WAVE CONVERTER TUBE WITH DOUBLE CONVERSION
INCLUDING A FREQUENCY CONTROL LOOP
Filed June 20, 1961
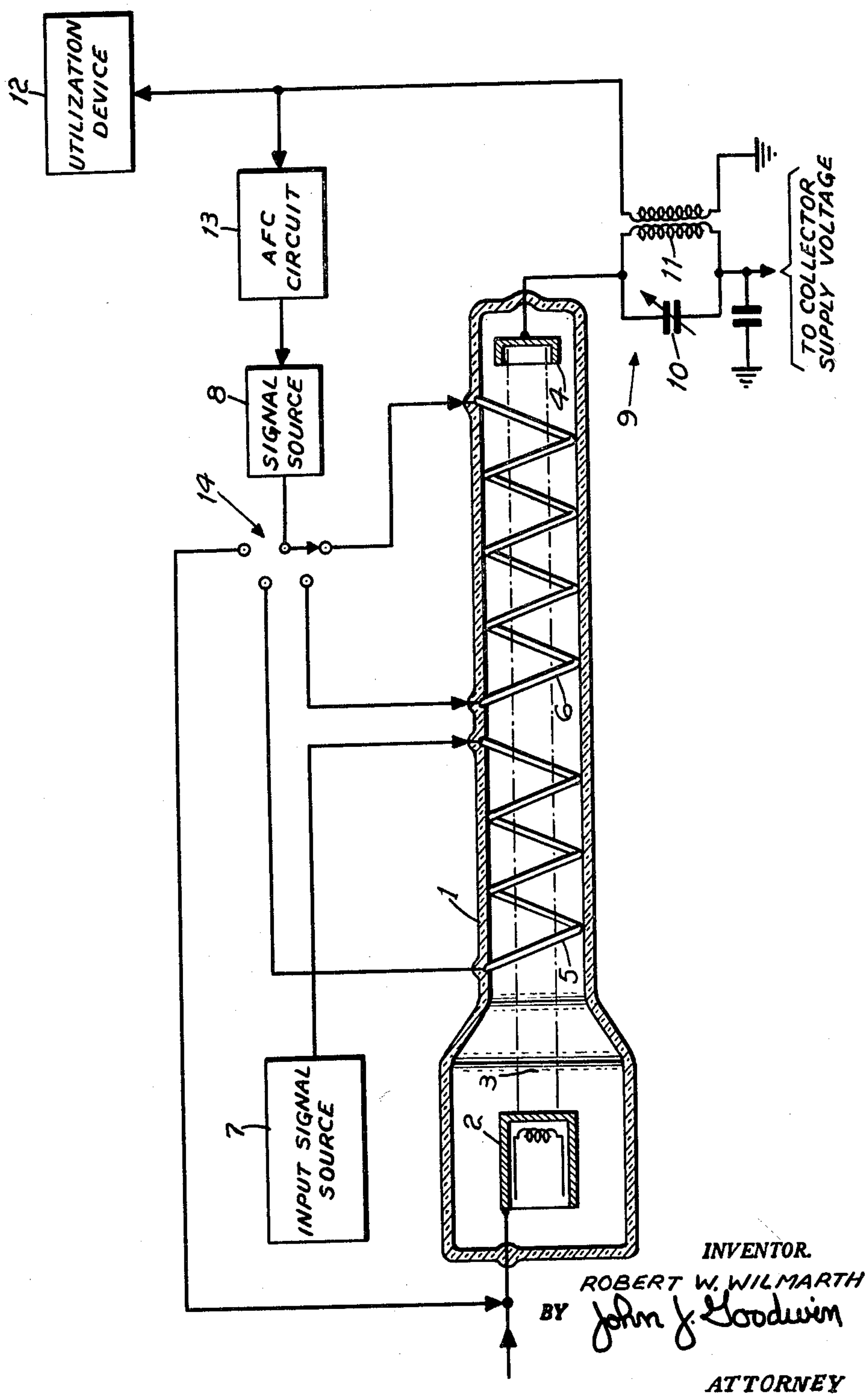
INVENTOR.
ROBERT W. WILMARTH
BY John J. Goodwin
ATTORNEY

United States Patent Office 3,176,232
Patented Mar. 30, 1965

3,176,232
BACKWARD WAVE CONVERTER TUBE WITH DOUBLE CONVERSION INCLUDING A FREQUENCY CONTROL LOOP

Robert W. Wilmarth, Bloomfield, N.J., assignor to International Telephone and Telegraph Corporation, Nutley, N.J., a corporation of Maryland Filed June 20, 1961, Ser. No. 118,336
3 Claims. (Cl. 325—447)

This invention relates generally to backward wave tubes and more particularly to a backward wave converted tube having two stages of frequency conversion.

In certain applications of backward wave tubes it is possible to receive a high frequency signal and to convert it into low intermediate frequency. The backward wave tube therefore operates as a frequency converter. According to one method a local oscillator associated with the tube is swept in frequency. The local oscillator output is mixed with the incoming signal and an intermediate frequency signal results. In another method in which the external local oscillator is eliminated, two backward wave circuits are placed in cascade along an electron beam. One of these circuits has its dimensions so chosen that for operation at the particular value of beam current the section acts as a backward wave oscillator. This oscillator velocity modulates the electron stream in accordance with its oscillation frequency. The other circuit has its dimensions so chosen that at the particular value of beam current it operates as an amplifier rather than an oscillator. The input signal is applied to this section, the signal is amplified and the electron beam is velocity modulated in accordance with the frequency of the signal. If the oscillator and signal frequencies are different the electron stream will be velocity modulated with two frequencies. The two modulations are mixed electronically on the beam to provide an intermediate frequency and suitable means may be provided to output couple the intermediate frequency of the beam.

In a backward wave amplifier the bandwidth of the device tends to be a fixed percentage of the particular center frequency. Typical bandwidths are in the order of ¼ to ½ percent of the center frequency. A similar condition exists in the first stage of the backward wave converted since this portion of the tube is essentially a backward wave amplifier. Now for proper converter performance it is desirable that the I.F. frequency is selected to minimize the image response. Generally the I.F. freqeunecy is set at approximately $\frac{1}{10}$ of the operating frequency. If we take this as an example the I.F. frequency would be 50 mc. at a center frequency of 500 mc. and 1000 mc. for a center frequency of 10,000 mc. It is obvious that in the later case the I.F. frequency is in itself a microwave frequency. This high I.F. frequency is not compatible with most I.F. systems, and it may be necessary to remix this frequency and convert down to a standard I.F. frequency, for example 60 mc. This might be done by using a separate local oscillator source and a crystal mixer. As a means of avoiding the use of a crystal mixer in a double conversion scheme the present invention provides for a backward wave tube wherein double conversion is accomplished by injecting the second oscillator signal directly into the converter, in this case the collector or I.F. output circuit would be tuned to the final I.F. frequency and the double mixing would take place in the electron beam.

An object of the present invention is to provide an improved backward wave converter tube wherein an intermediate frequency signal is produced by a double frequency conversion effected within the electron beam.

The present invention is explained with reference to the drawing, the single figure of which is a schematic illustration of a backward wave converter tube and the associated circuitry for producing two stages of frequency conversion.

Referring to the single figure a schematic illustration of a backward wave converter tube is shown. The tube elements, which are enclosed in an envelope 1, include an electron gun 2 which serves to project an electron beam 3 along the tube axis where it is received by a collector 4. The beam is shown coupled to a pair of helical structures 5 and 6 which propagate electromagnetic waves. Helix 5 is termed the input helix and helix 6 is referred to as the oscillator helix. A source of RF input signal 7 is coupled to the input helix 5 at its collector end by a suitable coupling, for example a coaxial to helical transition. The end of helix 5 nearest the electron gun is suitably terminated, for example the inner surface of envelope 1 may be coated with aquadag or the last few turns of the helix may be coated with attenuating material. The input RF signal travels along the conductor of helix 5 from the collector end to the electron gun end at essentially the speed of light, but due to the helical configuration, has an axial group velocity in the direction of the electron beam which corresponds to the velocity of the beam. The input wave on helix 5 interacts with the electron beam and the electrons traveling in the beam are velocity modulated as a result of the interaction. Helix 6 is dimensioned such that it oscillates for the particular value of beam current. Helix 6 is shown suitably terminated at the electron gun end, for example, it may be terinated similar to helix 5 as previously described, and oscillates at a frequency which corresponds to the applied voltage. Thus the electron stream is modulated at one frequency by helix 5 and at a different frequency by helix 6. The modulation produced in the beam is electronically mixed. The output signal at the mixed frequency may be removed at the collector 4 but this frequency, as discussed hereinabove, may not be suitable for most I.F. requirements.

As previously described, when a signal is applied to the input helix 5, a wave traveling along the helix interacts with the electron beam and tends to bunch or modulate the beam. The modulated electron beam then passes into a second helix 6 which is designed as an oscillator, where a separate frequency is produced by the mixing of the input frequency and the oscillating frequency. In general the device would be designed to utilize the lowest order difference frequency. Based on the foregoing remarks, it is seen that it is desirable to provide a further conversion of the separate (or I.F.) frequency resulting from the mixing of the input frequency and the oscillating signal in order that the resultant output signal from the tube be compatible with usual I.F. applications. In the present invention the second frequency conversion is performed within the electron beam, and a feedback circuit is provided in order to maintain the final I.F. frequency constant. By way of example, the input R.F. signal from source 7 may have a frequency of 10,000 mc., the oscillating frequency of helix 6 may be 9,000 mc. and the mixed frequency thereby produced in the electron beam will be 1,000 mc. A source of signal 8 having a frequency different from the input and oscillator frequencies is coupled to helix 6. The frequency of the signal from source 8 may be either 1060 or 940 mc., and by coupling this signal to helix 6, for example at the collector end thereof, a resultant signal is produced in the electron beam having a frequency of 60 mc. This is the final I.F. frequency and resulted from a double frequency conversion, in the electron beam. The electron beam 3, now having a suitable component I.F. frequency i.e. 60 mc., is removed at collector 4. The 60 mc. signal is removed from the collector output through a typical tuned circuit 9 including capacitor 10 and inductor 11. The I.F. signal may then be suitably coupled to a utilization device 12. An important feature of the present arrangement is that the I.F. output signal may be monitored by an AFC circuit 13, and if the I.F. signal varies or drifts from the desired value, a correction signal may be applied from AFC circuit 13 to adjust the frequency of source 8 an amount which will produce a compensating correction in the electron beam.

It is to be understood that the basic principle of the present invention is that a stable, usable I.F. signal may be effected by the double frequency conversion of an R.F. signal applied to a backward wave tube, the double conversion taking place within the electron beam of the tube. The embodiment in the drawing is preferred, but modifications of the structure are possible within the scope of the invention. For example, a switch 14 is shown at the output of source 8 to illustrate that it is also possible to couple the signal from source 8 to the gun end of helix 5 or 6, or to the gun 2 itself, etc.

While I have described above the principles of my invention in connection with specific apparatus, it is to be clearly understood that this description is made only by way of example and not as a limitation to the scope of my invention as set forth in the objects thereof and in the accompanying claims.

I claim:

1. A backward traveling wave tube comprising an electron gun for projecting an electron beam, a collector spaced from said gun for receiving said beam, a first helix, a source of signal at a first frequency coupled to said first helix for velocity modulating said beam according to said first frequency, a second helix for velocity modulating said beam in accordance with an internally generated frequency of oscillation, said frequency of oscillation being different from said first frequency so that a first difference frequency is produced in said beam, a source of signal at a third frequency coupled to said second helix for velocity modulating said beam to mix with said first difference frequency to produce a second lower difference frequency, a tuned output circuit connected to said collector responsive to said second difference frequency for coupling the second difference frequency signal off said beam and a frequency control circuit interconnected between said output circuit and said source of signal at said third frequency to adjust the frequency of said third frequency source and maintain said second difference frequency at a constant value.

2. A backward traveling wave tube according to claim 1 wherein said source of signal at said first frequency is coupled to the collector end of said first helix and said source of signal at said third frequency is coupled to the collector end of said second helix.

3. A backward traveling wave tube according to claim 1 wherein said source of signal at said first frequency is coupled to the collector end of said first helix and said source of signal at said third frequency is coupled to the gun end of said second helix.

References Cited in the file of this patent

UNITED STATES PATENTS

| | | |
|---|---|---|
| 2,657,305 | Knol et al. | Oct. 27, 1953 |
| 2,748,268 | Whinnery | May 29, 1956 |
| 2,820,139 | Adler | Jan. 14, 1958 |
| 2,906,868 | George | Sept. 29, 1959 |
| 2,916,658 | Currie | Dec. 8, 1959 |
| 2,964,671 | Chang | Dec. 13, 1960 |